US010055193B2

(12) United States Patent
Skoglund et al.

(10) Patent No.: US 10,055,193 B2
(45) Date of Patent: Aug. 21, 2018

(54) DATA TRANSFER BETWEEN CLOCK DOMAINS

(71) Applicant: NORDIC SEMICONDUCTOR ASA, Trondheim (NO)

(72) Inventors: Per Carsten Skoglund, Melhus (NO); Asghar Havashki, Trondheim (NO); Arne Wanvik Venas, Trondheim (NO); Asmund Holen, Langhus (NO); Markus Bakka Hjerto, Oslo (NO)

(73) Assignee: NORDIC SEMICONDUCTOR ASA, Trondheim (NO)

( * ) Notice: Subject to any disclaimer, the term of this patent is extended or adjusted under 35 U.S.C. 154(b) by 99 days.

(21) Appl. No.: 14/409,985

(22) PCT Filed: Jun. 20, 2013

(86) PCT No.: PCT/GB2013/051609
§ 371 (c)(1),
(2) Date: Dec. 19, 2014

(87) PCT Pub. No.: WO2014/001766
PCT Pub. Date: Jan. 3, 2014

(65) Prior Publication Data
US 2015/0186113 A1 Jul. 2, 2015

(30) Foreign Application Priority Data

Jun. 27, 2012 (GB) .................................. 1211424.5

(51) Int. Cl.
*G06F 1/04* (2006.01)
*G06F 1/12* (2006.01)
*G06F 5/06* (2006.01)

(52) U.S. Cl.
CPC .......... *G06F 5/06* (2013.01); *G06F 2205/061* (2013.01)

(58) Field of Classification Search
CPC ........ G06F 5/06; G06F 2205/061; G06F 1/12; H04L 7/0012
(Continued)

(56) References Cited

U.S. PATENT DOCUMENTS 4,392,226 A * 7/1983 Cook ...................... H04L 1/004
327/20
5,357,613 A 10/1994 Cantrell
(Continued)

FOREIGN PATENT DOCUMENTS

EP 0 953 976 A1 11/1999
JP H05 236026 A 9/1993

OTHER PUBLICATIONS

International Preliminary Report on Patentability from corresponding Appl. No. PCT/GB2013/051609, dated Jan. 8, 2015.
(Continued)

*Primary Examiner* — Nitin Patel
(74) *Attorney, Agent, or Firm* — Koppel, Patrick, Heybl & Philpott

(57) ABSTRACT

An arrangement for transferring a data signal (data_a) from a first clock domain (2) to a second clock domain (4) in a digital system. The arrangement has a signal input (6, 7) for receiving an input signal (data_a) from the first clock domain (2), means (6, 7) for storing the input signal (data_a), and means (12, 13) for transferring the input signal (data_a) to the second clock domain (4) following a transition in the clock signal (ck) of the second clock domain (4).

16 Claims, 2 Drawing Sheets

(58) Field of Classification Search
USPC .................. 713/600, 400; 710/61; 327/144; 375/354
See application file for complete search history.

(56) References Cited

U.S. PATENT DOCUMENTS

| | | | |
|---|---|---|---|
| 5,371,880 A * | 12/1994 | Bhattacharya | G06F 13/4217 710/100 |
| 5,905,766 A | 5/1999 | Nguyen | |
| 7,436,726 B1 * | 10/2008 | Lovejoy | G06F 5/10 365/221 |
| 2001/0042219 A1 * | 11/2001 | Robertson | G06F 5/10 713/400 |
| 2003/0081708 A1 | 5/2003 | Gelke et al. | |
| 2004/0230850 A1 * | 11/2004 | Baumgartner | G06F 1/12 713/320 |
| 2008/0084343 A1 * | 4/2008 | Heyl | H03H 17/0292 341/144 |
| 2009/0271651 A1 * | 10/2009 | Pothireddy | H04L 7/0012 713/400 |
| 2010/0306570 A1 | 12/2010 | Uchida | |
| 2012/0105113 A1 | 5/2012 | Maeno | |

OTHER PUBLICATIONS

Form PCT/ISA/220 notification of transmittal of the international search report and written opinion of the international searching authority dated Aug. 23, 2013, Form PCT/ISA/210 International Search Report, PCT/Isa/237 Written Opinion of the International Searching Authority for PCT/GB2013/051609.

Reasons for Refusal from corresponding Japanese Patent Appl. No. JP2015-519328, dated Mar. 7, 2017.

* cited by examiner

DATA TRANSFER BETWEEN CLOCK DOMAINS

This invention relates to systems and methods for transferring data signals between clock domains in digital systems, in particular where the clock domains are not synchronised.

In many different electronics systems, such as a wireless (e.g. Bluetooth) system, there exist two or more unsynchronised clock domains which are required, at least sporadically, to communicate with each other. These clock domains may run at different frequencies, for example, a central processor may run at a high frequency with one or more peripherals running at a low frequency. In addition, one of the clock domains may enter periods of inactivity, e.g. a sleep or standby mode, when it is not being used in order to save power. This is typically the faster clock domain, with the slower clock domain being used as a timer during these periods. In these periods there is generally no communication between the two clock domains.

When a data signal is desired to be transferred from one clock domain to another, it is known in these systems to employ a "handshaking" procedure in which the clock domains negotiate parameters in order to establish that the receiving clock domain is ready to receive a signal from the issuing clock domain, e.g. by the use of busy flags. This is necessary so that a signal can be transferred from the issuing clock domain during a safe period of the receiving clock domain, e.g. away from a transition (in which the clock changes from zero (0) to one (1) or one to zero) in the receiving clock domain on which data is changed, in order to avoid corruption of the signal or meta-stability of the system. However the known handshaking procedures are relatively slow as they require multiple cycles of the clock domains to achieve synchronisation between them, as well as requiring both clock domains to be active simultaneously. This consumes a significant amount of power, since both clock domains must be kept running during the procedure.

Furthermore, if the clock domain to which the data signal is being transferred is inactive or has a clock signal which is too slow to capture the data signal, i.e. compared to the time period over which the input data signal is active, then this will require the issuing clock domain to be kept active for a long time to wait for a suitable time for the receiving clock data to receive the data signal, by which time the data signal in the issuing clock domain may well have become inactive meaning it is no longer possible to transfer the signal. Thus it will be appreciated that this leads to data losses as well as consuming unnecessary power.

It is an aim of the present invention to provide improved systems and methods for communication between two clock domains in a micro-processor system.

When viewed from a first aspect the invention provides an arrangement for transferring a data signal from a first clock domain to a second clock domain in a digital system, the arrangement comprising:
 a signal input for receiving an input signal from the first clock domain;
 means for storing the input signal; and
 means for transferring the input signal to the second clock domain following a transition in the clock signal of the second clock domain.

The invention also provides a method of transferring a data signal from a first clock domain to a second clock domain in a digital system, the method comprising:
 receiving an input signal from the first clock domain;
 storing the input signal;
 transferring the input signal to the second clock domain following a transition in the clock signal of the second clock domain.

Generally the first clock domain will comprise a first clock and the second clock domain will comprise a second clock which are unsynchronised. They may have different frequencies, i.e. the first clock has a greater frequency than the second clock or vice versa. The data signal could be arranged to be transferred on either or both of a positive and a negative transition in the second clock. However, preferably the data signal is transferred on a positive transition.

Thus it will be appreciated that by storing the input signal and subsequently transferring it to the second clock domain, the arrangement is configured to cope with receiving an input signal from the first clock domain when the second clock domain is inactive or while it is waiting for a transition in the second clock cycle if this is a much longer time than the period of time over which the input signal is active and being received, i.e. it is not a requirement for the first and second clock domains to be active at the same time as it is for a conventional handshaking procedure. Thus the amount of power consumed by the system can be dramatically reduced since the first clock domain only needs to be active for the period of time that the input signal is being received, and the second clock domain only needs to be active for the period time that the input signal is being transferred to the second clock domain; neither clock domain needs to be kept active for an unnecessary length of time, e.g. while waiting for the other clock domain to become active.

Furthermore, the arrangement allows the input signal to be transferred quickly, as storing the input signal enables the signal to be transferred once a transition in the second clock signal has been detected (though time may need to be allowed to pass the input signal through the transferring means); the system does not need to wait for any handshaking procedure to be completed before the input signal is transferred. The transition in the second clock signal also allows the transfer of the input signal into the second clock domain to be accurately defined in time, e.g. as an "event" in the second clock domain relative to the transition.

In contrast with prior art 'handshaking' procedures it is not necessary to put a hold on the data in the source clock domain to prevent it changing until the transfer has taken place which is beneficial.

As mentioned, the present invention is particularly suited, but not limited, to deal with the two general circumstances in which the second clock domain is inactive when the input signal is received from the first clock domain or the frequency of the second clock is too slow to be able to capture the input signal before the input signal becomes inactive. In the situation in which the second domain is active when the input signal is received, there exists the trivial case in which the frequency of the second clock is high enough to capture the input signal while it is active, i.e. a transition occurs in the second clock to trigger the transfer of the input signal to the second clock domain before the input signal changes value or the first clock domain becomes inactive. For the case for which the present invention is of particular benefit, the frequency of the second clock is too low to be able to capture the input signal before it becomes inactive, either because it changes value or the first clock domain becomes inactive itself. However, because the receipt and the transfer of the input signal are temporally independent as well as being buffered by the storage means, the input signal can be stored in the storage means until the next transition in the second clock is detected, enabling the input signal to then be transferred to the second clock domain. Typically, the period of the second clock will be greater than the duration of the input signal, i.e. so that a transition in the second clock cannot be guaranteed during the time in which the input signal is active. For example, for a one bit signal, the duration of the input signal is the time between the positive and negative edges of the signal. The duration of the input signal can be any length.

In one set of embodiments the signal input comprises one or more flip-flops, e.g. D-type flip flops. Preferably the input signal is fed to the "set" (S) input of the flip-flop, and also preferably the flip-flop is clocked by the second clock. This enables the input signal to pass directly to the Q output of the flip-flop without having to be reliant on a running clock to clock it through the flip-flop, e.g. from the D input. This also eliminates the need for a dedicated feedback loop to clear the flip-flop(s). Preferably the D input to the flip-flop is grounded. This arrangement allows the input signal to be received into the system and stored, either in the case where the second clock domain is inactive, or the second clock is so slow that the input signal will become inactive before the clock can clock the signal through the flip-flop, because passing a signal through the S input of the flip-flop overrides having to wait for a clock signal into the flip-flop. The arrangement is also insensitive to changes in the input signal as the stored signal is simply transferred when the second clock domain becomes active. It therefore does not require a handshake or a "safe" signal to be sent confirming that the input signal is ready to be received from the first clock domain. Again, this means that the input signal can be transferred asynchronously without any temporal relationship between the two clock domains. Providing two or more flip-flops, e.g. in series, reduces the chances of the input signal not being passed through the flip-flop correctly, owing to an unstable state in the output of the flip-flop, e.g. when the input signal goes inactive in a one to zero transition while the second clock is active. If this output is then fed into the input of a further flip-flop, the chance of an unstable state being passed through both the flip-flops is very small, i.e. because the probabilities are multiplicative.

In the circumstance in which the second clock domain is inactive when the input signal is received, there is no transition in the second clock with which to transfer the input signal through to the second clock domain. The arrangement therefore has to wait for the second clock domain to become active in order for a transition in the second clock to occur following which the input signal can be transferred to the second clock domain. However the Applicant has devised an advantageous feature which overcomes having to wait for what could be a long time for the second clock domain to become active. Therefore in one set of embodiments the arrangement comprises means to activate the second clock domain, i.e. start the second clock.

The request to activate the second clock domain could be triggered by the receipt of a new input signal. However, as the second clock domain will generally be controlling a device which is only periodically active, with the second clock domain regularly entering and exiting sleep or standby modes, in one set of embodiments the request to activate the second clock domain comes from an external source. For example, if the second clock domain is controlling a peripheral which is woken from its sleep mode by use of that peripheral, the request for activating the second clock domain will come from whatever detects that the peripheral is wanting to be used, though this detection mechanism could be in the first clock domain itself and so the request could be triggered by the input signal. This then activates the second clock domain such that it is then able to receive a data signal from the first clock domain.

By activating the second clock domain, if necessary, the input signal can be transferred more quickly to the second clock domain. Again, there is no requirement for the first and second clock domains to be active simultaneously as with conventional handshaking procedures, so even though the request signal to activate the second clock domain may be sent as soon as the input signal is received, by the time the second clock domain becomes active, the first clock domain may have become inactive, e.g. after the input signal has been sent.

Once the second clock domain has been activated, i.e. the second clock started, a transition in the second clock will occur within a maximum of one clock cycle (if a certain transition, e.g. positive, is being used), enabling the input signal to be transferred to the second clock domain, though as mentioned previously the input signal may then take a finite period of time, e.g. two clock cycles, to pass through the transferring means. Preferably the clock in the second clock domain is started at a point in its cycle such that a transition will occur relatively soon, e.g. within half a clock cycle of a transition, e.g. at a point just before a relevant transition (one on which data is changed), so that if the second clock has a particularly low frequency, the time to wait for a transition can be minimised. This starting of the clock could also be used to restart the second clock closer to a transition if it is active but has a low frequency, i.e. the request for the activation of the second clock domain may not just be used for when the second clock domain is inactive, a request signal to restart the clock could be sent if the second clock is particularly slow, e.g. has a period greater than the duration of the input signal. However there may be a risk in restarting the second clock that some of the data values in the second clock domain are lost. The request signal could be sent as soon as the input signal is detected, as above for when the second clock domain is inactive, or the request signal could be sent after a predetermined period of time has elapsed following the detection of the input signal if a transition in the second clock has not occurred. This configuration could also be used when the second clock domain is inactive, e.g. so that the activating means does not need to determine whether the second clock domain is active or not, it simply waits for a predetermined period of time and if a transition in the second clock has not occurred, it sends a signal to activate the second clock.

The first and second clock domains may have known cycles of activity and inactivity relative to each other, and thus the second clock domain may know automatically when to wake up from a period of inactivity in order to receive an input signal from the first clock domain. However for most arrangements the two clock domains will be relatively autonomous. Therefore in one set of embodiments the means to activate the second clock domain comprises means to detect that an input signal has been received at the signal input. This may be provided by a component in the signal input or by a further component downstream, e.g. one or more flip-flops. This minimises the time taken to transfer the input signal as the activating means can send a request signal to the second clock domain as soon as the input signal has been detected.

The request signal to activate the second clock domain could comprise a short duration pulse which simply acts to activate the second clock domain. However the request signal could be more intimately linked to one or more signals in the system, e.g. the input signal or the second clock signal. In one set of embodiments the request signal could be active, e.g. have a value of one, for an extended period of time. The extended period of the request signal could be linked to the input signal, e.g. sent by the activating means as soon as the input signal is received (on its positive edge) and cancelled when the input signal becomes inactive (on its negative edge), or it could be linked to the second clock signal, e.g. the extended period is ended once the second clock signal has been received. Alternatively the request signal could have a time delay relative to the input signal which could, for example, be determined by the first or second clock. This would typically be a positive transition in the clock cycle, e.g. the request signal could be sent on the next positive transition after receipt of the input signal. Another option is that the sending and/or cancellation of the request signal by the activating means could be dependent on other components and/or signals in the arrangement. For example, the request signal could be cancelled once the transfer of the input signal to the second clock domain has been completed. The cancellation of the request signal allows the second clock domain to become inactive, i.e. return to its sleep or standby mode on the negative transition, quickly following the transfer of the input signal, therefore reducing the time that the second clock domain is active in order to reduce the power consumption of the system.

The means for storing the signal input from the first clock domain could comprise any suitable data storage component, arrangement or device which is able to store the signal while the second clock domain is inactive or active but waiting for a transition in the second clock cycle. This could comprise a register. Such a component may store the input signal until it detects a transition in the clock cycle of the second clock domain, or receives a signal from another component which performs this detection, e.g. one or more flip-flops, following which the input signal is transferred to the second clock domain. Thus more generally the flip-flop (s) may be clocked by the second clock, e.g. on the positive edge of its cycle, though the negative or both edges could be used instead. The storage means could receive the input signal from the signal input, i.e. the storage means and the signal input could comprise separate components: one to receive the input signal and one to store the input signal. However this function could also be performed by a single component which receives and stores the signal input from the first clock domain.

As with the other components in the system, the means for transferring the input signal from the storage means to the second clock domain could comprise any suitable component for performing this task, e.g. one or more flip-flops. The data is transferred following a transition in the second clock. The transfer could happen on the transition, i.e. as soon as it is detected, or there may be a synchronisation period between the transition and the transfer. Providing a synchronisation period helps the system to avoid meta-stability because data values in the second clock domain, e.g. coming from the first clock domain, may change on the transitions in the second clock cycle. In this circumstance it is therefore desirable to avoid transferring data into the second clock domain near to the transition to prevent any confusion between data signals. The synchronisation period is generally determined by the second clock, e.g. a subsequent transition in the clock cycle. The synchronisation period may also be dependent on the component used for transferring the input signal to the second clock domain. For example, if the transfer means comprises one or more flip-flops which are clocked by the second clock, there will be a built in synchronisation period dependent upon the number of flip-flops the input signal needs to be passed through before being output to the second clock domain.

As has been discussed, it is advantageous for the input signal to be transferred into the second clock domain on or relative to a transition in the second clock cycle, in order to create a defined event or time stamp associated with the data signal.

Furthermore it is advantageous for the input signal not to be transferred when the first and/or second clock domain is in an unknown state, e.g. when the system is first started up, to prevent a data signal being presented into the second clock domain without an associated time stamp or in an unknown state itself. In one set of embodiments the arrangement comprises means to block the transfer of the input signal to the second clock domain, e.g. if first and/or second clock domain is in an unknown state. The block on the transfer of the input signal helps to create a defined signal when the clock becomes active, i.e. the transferred input signal will have a well defined time stamp in the second clock domain. For example, all the data values in the transferring means could be set to zero such that once the clock becomes active and an input signal is received, a definite zero to one transition can be seen, thus reducing the risk of data corruption or meta-stability. This also eliminates the possibility of detecting false active inputs.

The blocking means could comprise any suitable component, e.g. one or more flip-flops. This could be the same component, e.g. flip-flops, as one or more of the other components in the arrangement, e.g. the signal input, but preferably the blocking means is a separate component. The output from the blocking means is preferably combined with the output from the signal input, e.g. in an AND gate, in order to provide the block on the input signal being transferred. If the blocking means comprises one or more flip-flops, a blocking signal could be fed to the "reset" (R) input of the flip-flops such that the Q output is always 0, thus providing the block on the input signal. Preferably the flip-flops are clocked by the second clock. The use of the flip-flops in this way also ensures that a defined signal is produced when the second clock domain becomes active, e.g. there is a clear change from zero to one clocked on the positive edge of the second clock signal, which helps to provide a defined time stamp to be associated with the transfer of the input signal into the second clock domain. Another advantage of the blocking means is that when the block is put back on the transfer of the input signal, e.g. when the second clock domain returns to an inactive state or one or both of the clock domains enters an unknown state, this blocking signal can be used to clear all the registers in the arrangement, e.g. the storage means, such that when the next input signal is received, the arrangement can clearly detect the receipt of the new signal.

As has been discussed, because of the provision of the storage means and therefore the independence of the first and second clock domains, i.e. they do not have to be active at the same time as in conventional handshaking procedures, there is also no requirement on the absolute or relative frequency of the first and second clock domains. None of the components in the arrangement are dependent on any particular frequency for the first or second clock domains in order to operate in the manner discussed. Although the frequency of the first clock domain could be an integer multiple of the frequency of the second clock domain (or vice versa) and/or have a fixed phase, in general no synchronisation or particular relationship is required in accordance with the present invention. Furthermore, embodiments of the invention are tolerant to the first and/or second clock domains entering a sleep or standby mode and restarting asynchronously.

Certain embodiments of the invention will now be described, by way of example only, with reference to the accompanying drawings, in which.

Figure 1:
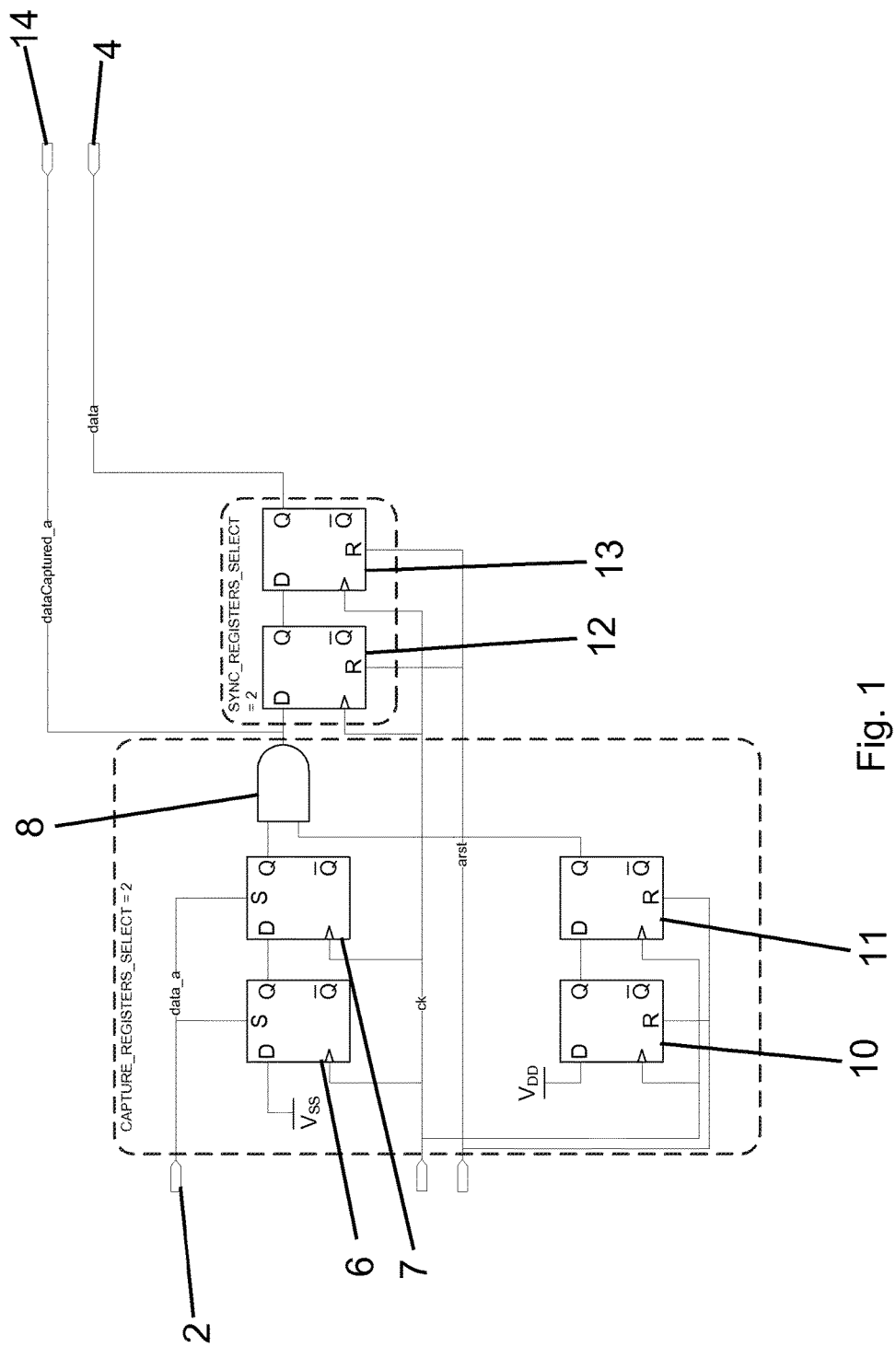
FIG. 1 shows a diagram of an arrangement in accordance with the invention.

FIG. 1 shows a schematic logic arrangement embodying the invention. The arrangement is arranged to transfer an input signal, data_a, from a first clock domain 2 to a second clock domain 4. Generally the first clock domain 2 will comprise a first clock, and the second clock domain 4 will comprise a second clock. The invention is independent of the frequencies, either absolute or relative of the first and second clocks; they may take any values.

The arrangement comprises a pair of flip-flops 6, 7 in series which receive the input signal, data_a, to their S input, the first of the flip-flops 6 receiving a 'zero' input $V_{SS}$ at its D input. The flip-flops 6, 7 are clocked by the second clock, ck, with the Q output of the final flip-flop 7 being fed to an AND gate 8. The other input to the AND gate 8 is the Q output from another pair of flip-flops 10, 11 arranged in series. These flip-flops 10, 11 are also clocked by the second clock, ck, and receive a reset signal, arst, to the R input of the flip-flops 10, 11. A 'one' input $V_{DD}$ is fed to the D input of the first of these flip-flops 10.

The output, dataCaptured_a, from the AND gate 8 is fed to the D input of a further pair of flip-flops 12, 13, as well as being sent to another output 14, from where it can be used in other parts of the system. These pair of flip-flops 12, 13 are arranged in series, are clocked by the second clock, ck, and receive the reset signal, arst, to the R input of the flip-flops 10. The Q output, data, from the final flip-flop 13 is output to the second clock domain 4.

The operation of the arrangement shown in FIG. 1 is now described. Initially when the arrangement starts up, or is undergoing a reset, the reset signal, arst, is set to one. As the reset signal, arst, is fed to the R input of the two flip-flops 10, 11 at the bottom left of FIG. 1, the Q output of the flip-flops 10, 11 is zero, regardless of the value at the D input to the flip-flops 10, 11. This zero value from the Q output of the final flip-flop 11 which is fed to the AND gate 8, prevents any signal from passing through the AND gate 8 and also sets the output, dataCaptured_a to zero. The reset signal, arst, is also fed to the R input of the pair of flip-flops 12, 13 shown on the right hand side of FIG. 1, which sets the output, data, to zero. Thus it can be seen that the reset signal is used to clear all the output values in the arrangement such that when a new input signal is received, there will be a defined transition from zero to one as this signal propagates through the arrangement. At some point, synchronous to the second clock, ck, the reset signal, arst, is set to zero, thus allowing a one signal from the D input, $V_{DD}$, to the bottom left flip-flop 12 to be passed through to the AND gate 8.

In the meantime, an input signal, data_a, could be received at the S input of the two flip-flops 6, 7 at the top left of FIG. 1, i.e. a value of one is fed to the flip-flops 6, 7. When this is input signal, data_a, is received, it raises the Q output of the flip-flops 6, 7 to one, regardless of their D input. Even if this input signal, data_a, subsequently becomes inactive, the original input signal will be stored at the Q outputs of the flip-flops 6, 7, as long as the second clock, ck, has not become active and passed a zero, $V_{SS}$ signal through from the D input.

The operation of the arrangement then depends on the status of the second clock domain 4, i.e. whether it is active or not. As long as the reset signal, arst, is not set, at this stage the input signal, data_a, will have passed through the AND gate 8 in two cycles of the second clock, ck, and be output as dataCaptured_a, i.e. the input data has been captured and stored. However, if the second clock domain 4 is not active, or the second clock, ck, is so slow that a positive transition has yet to be reached, the data signal cannot pass any further through the arrangement, i.e. through the synchronisation flip-flops 12, 13.

Once the second clock, ck, has become active, the output, dataCaptured_a from the AND gate 8, can then be passed through the final two synchronisation flip-flops 12, 13, clocked by the second clock, ck. Once the signal dataCaptured_a has been passed through these flip-flops 12, 13, it is transferred from the Q output of the final flip-flop 13 to the second clock domain 4 as the output data signal, data. This data signal is therefore synchronised with the second clock, ck.

If the second clock domain 4 is active when the input signal, data_a, is received by the first pair of flip-flops 6, 7, this can be passed through the AND gate 8, as described above, and then clocked through the middle pair of flip-flop 12, 13 to be transferred as the synchronised output signal, data, to the second clock domain 4.

However, if the second clock, ck, has a particularly low frequency, it is possible that a positive transition in the second clock, ck, will not occur for a long time, which could even be after the input signal, data_a, becomes inactive, i.e. returns to a zero value. In this case, the input signal, data_a, is stored at the Q output of the first two flip-flops 6, 7 to wait for a positive transition in the second clock, ck, as described above.

Figure 2:
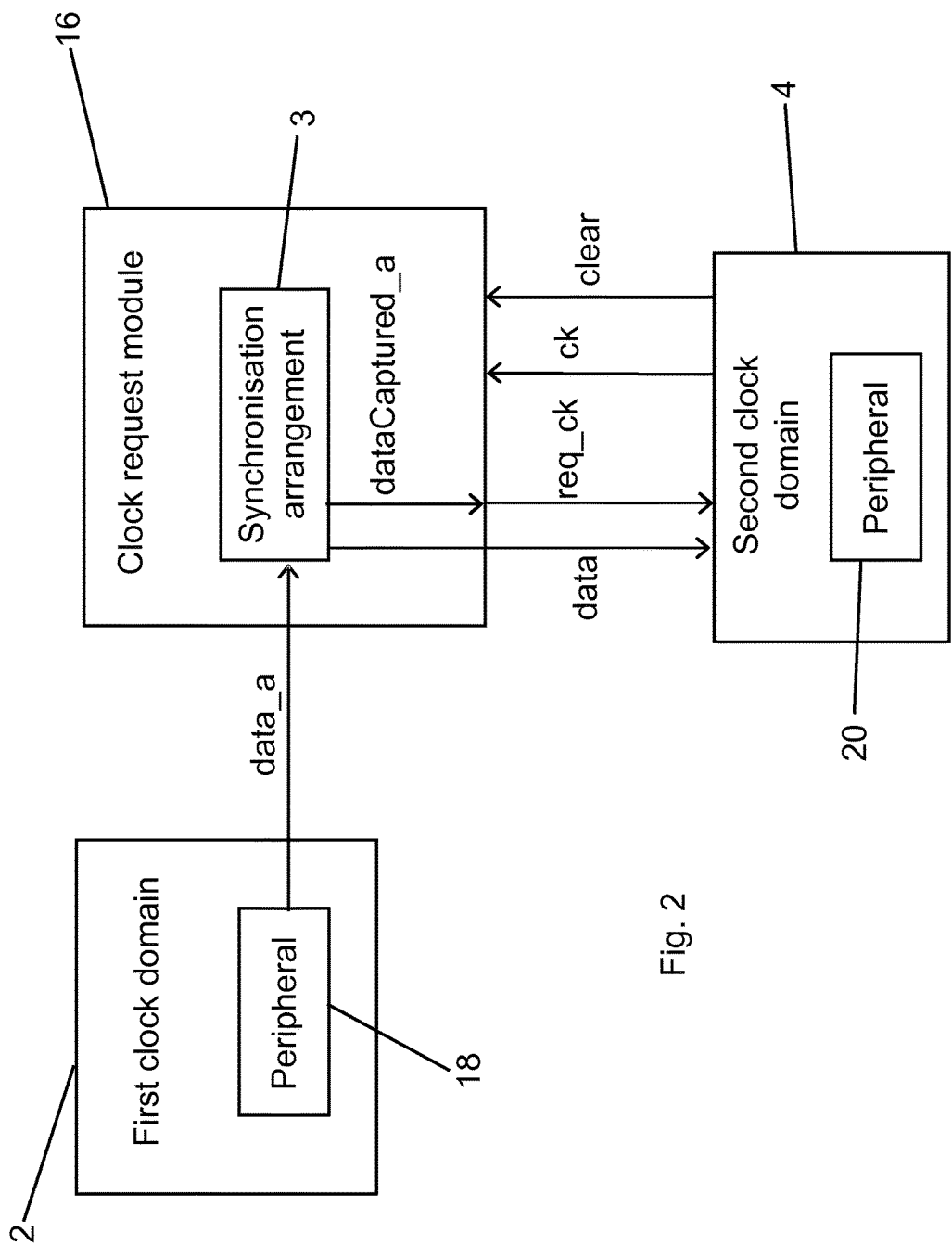
FIG. 2 shows a schematic block diagram of another embodiment of the invention.

FIG. 2 shows an embodiment of the invention which is particularly useful for when the second clock domain is inactive but a data signal is available to be transferred from the first clock domain. The arrangement shown in FIG. 1 is represented by a box 3 in FIG. 2. The synchronisation arrangement 3 receives, as in FIG. 1 an input signal, data_a, from a peripheral 18 in the first clock domain 2, and outputs a data signal, dataCaptured_a. The components in the synchronisation arrangement 3 are clocked by the second clock, ck. The system also comprises a clock request module 16 which contains the synchronisation arrangement 3, and is connected to the clock request module 16.

In operation a peripheral 18 in the first clock domain 2 detects a change in its state, e.g. a motion detector in a mouse which is in a sleep mode detects that the mouse has been moved. This causes the peripheral 18 to output a signal, data_a, which is received by the synchronisation arrangement 3 in the clock request module 16. The input signal, data_a, indicates that a second clock domain 4 which includes a further peripheral 20, e.g. a chip in the mouse, is required for the device (e.g. the mouse) to be used, but that the second clock domain 4 is inactive, i.e. there is no second clock signal, ck, with which to transfer in data signals from the first clock domain 2. The synchronisation arrangement outputs a signal, dataCaptured_a, which causes the clock request module 16 to output a signal, req_ck, to the second clock domain 4, requesting that the second clock, ck, be started to activate the second clock domain 4. The second clock, ck, is then activated and its signal fed back to the clock request module 16 where it can be used by the synchronisation arrangement 3, e.g. to transfer the input signal, data_a, from the first clock domain 2 to the second clock domain 4 as a signal, data. The second clock, ck, can also be used by the peripheral 20, e.g. to take whatever actions that are required.

Once the clock, ck, from the second clock domain 4 has been received by the clock request module 16, a signal, clear, can be sent to the clock request module 16 to indicate that the second clock, ck, is no longer required. This signal will generally be generated at a positive edge of the second clock, ck, e.g. at the final step of transferring the data signal to the second clock domain 4, and allows the second clock domain 4 to enter back into a sleep or standby mode.

It will be appreciated by those skilled in the art that many variations and modifications to the embodiments described above may be made within the scope of the various aspects of the invention set out herein. For example it is not necessary to provide both flip-flops with R and S inputs individually, these could be combined into flip-flops with both R and S inputs. In the arrangement shown in FIG. 2, further synchronisation arrangements could be provided where necessary, e.g. to synchronise additional transfers of data between the first and second clock domains.

The invention claimed is:

1. An arrangement for transferring a data signal from a first clock domain to a second clock domain in a digital system, the arrangement comprising:
   a flip-flop for receiving an input signal directly from the first clock domain, wherein the input signal is fed to a "set" (S) input of the flip-flop and a "data" (D) input of the flip-flop is connected to ground;
   a storing circuit portion for storing the input signal; and
   a transferring circuit portion for transferring the input signal to the second clock domain following a transition in the clock signal of the second clock domain.

2. An arrangement as claimed in claim 1, wherein the first clock domain comprises a first clock and the second clock domain comprises a second clock which are unsynchronised.

3. An arrangement as claimed in claim 1, wherein the data signal is transferred on a positive transition.

4. An arrangement as claimed in claim 1, wherein the flip-flop is clocked by the second clock.

5. An arrangement as claimed in claim 1, comprising an activation circuit portion to activate the second clock domain.

6. An arrangement as claimed in claim 5, wherein a request to activate the second clock domain comes from an external source.

7. An arrangement as claimed in claim 5, wherein the activation circuit portion domain is arranged to detect that an input signal has been received at the flip-flop.

8. An arrangement as claimed in claim 1, comprising a blocking circuit portion to block the transfer of the input signal to the second clock domain.

9. A method of transferring a data signal from a first clock domain to a second clock domain in a digital system, the method comprising:
   receiving an input signal directly from the first clock domain;
   feeding the input signal to a "set" (S) input of a flip-flop, wherein a "data" (D) input of the flip-flop is connected to ground;
   storing the input signal;
   transferring the input signal to the second clock domain following a transition in the clock signal of the second clock domain.

10. A method as claimed in claim 9, wherein the first clock domain comprises a first clock and the second clock domain comprises a second clock which are unsynchronised.

11. A method as claimed in claim 9, comprising transferring the data signal on a positive transition.

12. A method as claimed in claim 9, comprising clocking the flip-flop by the second clock.

13. A method as claimed in claim 9, comprising activating the second clock domain.

14. A method as claimed in claim 13, wherein a request to activate the second clock domain comes from an external source.

15. A method as claimed in claim 13, wherein the step of activating the second clock domain comprises detecting that an input signal has been received at the flip-flop.

16. A method as claimed in claim 9, comprising blocking the transfer of the input signal to the second clock domain.

* * * * *